United States Patent
Domingo Yaguez

(10) Patent No.: US 9,542,150 B2
(45) Date of Patent: *Jan. 10, 2017

(54) CONTROLLING AUDIO PLAYERS USING ENVIRONMENTAL AUDIO ANALYSIS

(71) Applicant: Intel Corporation, Santa Clara, CA (US)

(72) Inventor: Gustavo D. Domingo Yaguez, Cordova (AR)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/625,100

(22) Filed: Feb. 18, 2015

(65) Prior Publication Data

US 2015/0331658 A1    Nov. 19, 2015

Related U.S. Application Data

(63) Continuation of application No. 12/459,128, filed on Jun. 26, 2009, now Pat. No. 8,983,640.

(51) Int. Cl.
*G06F 17/00* (2006.01)
*G06F 3/16* (2006.01)
(Continued)

(52) U.S. Cl.
CPC ............... *G06F 3/165* (2013.01); *G10L 15/22* (2013.01); *G10L 17/005* (2013.01); *G10L 2015/223* (2013.01)

(58) Field of Classification Search
CPC ............ G06F 3/16; G06F 3/165; G10L 15/24; G10L 15/26; G10L 17/00; G10L 17/005; G10L 15/22; G10L 2015/223; H03G 3/00; H03G 3/20; H03G 3/26; H03G 3/32; H03G 3/342

(Continued)

(56) References Cited

U.S. PATENT DOCUMENTS 6,122,615 A    9/2000  Yamamoto
2002/0137505 A1  9/2002  Eiche
(Continued)

FOREIGN PATENT DOCUMENTS

EP    1569425    8/2005
JP    H08102601    4/1996
(Continued)

OTHER PUBLICATIONS

Chinese Patent and Trademark Office, Office Action, mailed Jun. 11, 2015 in Chinese Application No. 201010185495.1.
(Continued)

*Primary Examiner* — Andrew C Flanders
(74) *Attorney, Agent, or Firm* — Trop, Pruner & Hu, P.C.

(57) ABSTRACT

A method, system, and computer program product containing instructions for analyzing audio input to a receiver coupled to an audio player to identify an audio event as one of a plurality of pre-determined audio event types. In response to identifying the audio event, the audio player is caused to adjust an audio output. Adjusting the audio output may include causing the audio player to pause playing audio output or to lower the volume of the audio output. The audio input to the receiver may be recorded. In response to identifying the audio event, the audio player may be caused to replay a recorded portion of the audio input. The recorded portion of the audio input may include a portion recorded prior to identifying the audio event.

19 Claims, 4 Drawing Sheets

(51) Int. Cl.
*G10L 17/00* (2013.01)
*G10L 15/22* (2006.01)

(58) Field of Classification Search
USPC ........ 700/94; 381/56–58, 74, 119, 309, 311; 369/4; 455/3.06
See application file for complete search history.

(56) References Cited

U.S. PATENT DOCUMENTS

| | | | |
|---|---|---|---|
| 2007/0185601 | A1 | 8/2007 | Lee |
| 2008/0037749 | A1* | 2/2008 | Metzger .................. H04M 3/56 379/202.01 |
| 2009/0082071 | A1 | 3/2009 | Hicks, III |
| 2009/0290718 | A1 | 11/2009 | Kahn |
| 2012/0034904 | A1 | 2/2012 | Lebeau |

FOREIGN PATENT DOCUMENTS

| | | |
|---|---|---|
| JP | 2002-182691 | 6/2002 |
| JP | 2005-049153 | 2/2005 |
| JP | 2005192004 | 7/2005 |
| JP | 2007334968 | 12/2007 |
| JP | H03145585 | 10/2008 |
| WO | 9957714 | 11/1999 |

OTHER PUBLICATIONS

Chinese Patent and Trademark Office, Office Action, mailed Jan. 5, 2013 in Chinese Application No. 201010185495.1.
European Patent Office, European Search Report, mailed Mar. 3, 2013 for Application No. 10 250 861.1-1901/2267695.
European Patent Office, Examination Report, mailed Feb. 19, 2014 for Application No. 10 250 861.1-1901/2267695.
Japanese Patent Office, Office Action, mailed Aug. 13, 2013 in Japanese Application No. 2010-145334.
Japanese Patent Office, Office Action, mailed Mar. 19, 2013 in Japanese Application No. 2010-145334.
Japanese Patent Office, Office Action, mailed Oct. 19, 2012 in Japanese Application No. 2010-145334.
State Intellectual Property Office of the People's Republic of China, Decision of Rejection, mailed Aug. 1, 2013, in Chinese Application No. 201010185495.1.

* cited by examiner

CONTROLLING AUDIO PLAYERS USING ENVIRONMENTAL AUDIO ANALYSIS

This application is a continuation of U.S. patent application Ser. No. 12/459,128, filed Jun. 26, 2009, the content of which is hereby incorporated by reference.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to the operation of audio devices.

BACKGROUND

The portable music player has become a ubiquitous part of today's society. People everywhere listen to music as part of their daily lives, while commuting, working, and playing. The integration of portable music players into another ubiquitous device, the mobile telephone, has extended the length of time people wear their earphones during a typical day.

This connection to audio devices isolates people from others in their surrounding environment. To garner the attention of a person wearing earphones, others may raise their voices in an attempt to speak loudly enough to be heard over the music playing or make a physical gesture to attract the attention of the person wearing earphones. Once his or her attention is garnered, the person wearing earphones typically must pause the music or lower the music volume before a conversation can begin.

DETAILED DESCRIPTION

Embodiments of the present invention include a scheme to control audio players using environmental audio analysis. An audio environment manager identifies audio events of interest in the surrounding environment and controls an audio player in response to those environmental audio events. For example, the audio environment manager may recognize the spoken name of a user of the audio device, another spoken word or phrase, a voice that the system is pre-configured to recognize, and/or a particular type of sound. The audio environment manager may use the proximity of the sound to the audio device to assess whether a sound in the surrounding environment is of sufficient interest to affect the control of the audio player.

In response to identifying an audio event of a predetermined audio event type, the audio environment manager causes the player of an audio output to adjust the audio output. For example, the audio environment manager may cause the audio player to pause or lower the volume of the audio output.

In one embodiment, the audio environment manager records audio input to an audio receiver in the surrounding environment. In response to identifying an audio event of interest, the audio environment manager causes the audio player to play a recorded portion of the audio input. For example, a portion of a message that was recorded prior to identifying the audio event may be played because that portion of the message occurred before control of the audio player could be affected. This feature enables the user to hear sounds that were obscured by the music or other audio output of the audio player when the sound occurred.

Figure 1:
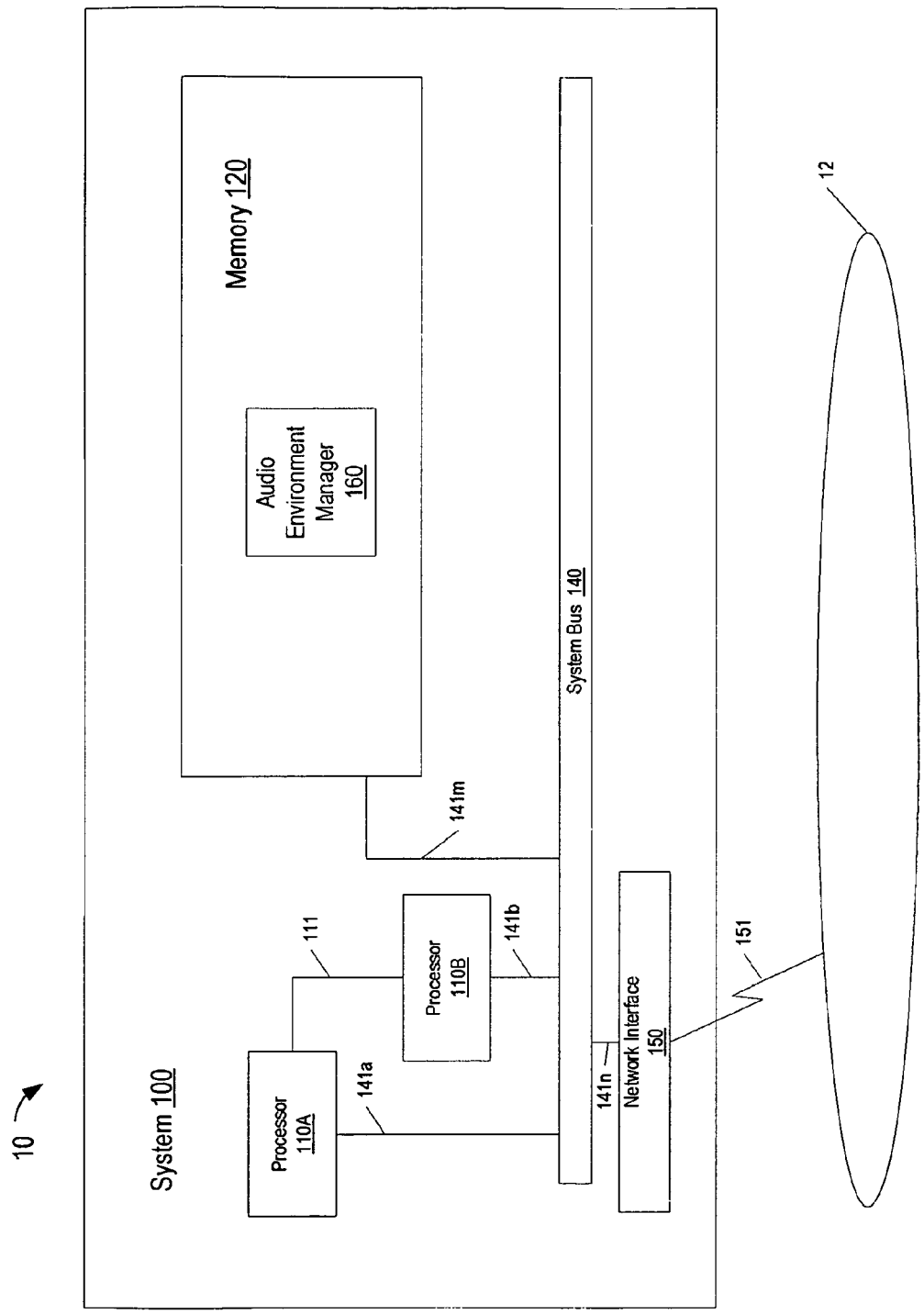
FIG. 1 is a block diagram depicting a suitable data processing environment in which certain aspects of an example embodiment of the present invention may be implemented.

FIG. 1 is a block diagram depicting a suitable data processing environment 10 in which certain aspects of an example embodiment of the present invention may be implemented. Data processing environment 10 includes a processing system 100 that includes one or more processors or central processing units (CPUs), shown here as processors 110A and 110B. One of skill in the art will recognize that, while two processors are shown, a single processor or any number of multiple processors may provide processor functionality to processing system 100. Each of processors 110A and 110B may be a single-core or a multi-core processor. Processors 110A and 110B are shown as communicatively coupled to various other components including a memory 120 via one or more system buses 140 or other communication pathways or mediums. Processors 110A and 110B are also shown as connected via a point-to-point processor interconnection 111, such as a HyperTransport link or an Intel QuickPath Interconnect (QPI).

An audio environment manager 160 manages the audio environment provided by processing system 100. Audio environment manager 160 may be implemented as instructions executed by processor 110A and/or processor 110B within memory 120.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, mobile Internet devices (MIDs), and other devices for processing or transmitting information.

Processing system 100 may be controlled, at least in part, by input from conventional input devices, such as keyboards, mice, etc., and/or by directives received from another machine, biometric feedback, or other input sources or signals. Processing system 100 may utilize one or more connections to one or more remote data processing systems (not shown) in data processing environment 10, such through a network interface controller (NIC) such as network interface 150, a modem, or other communication ports or couplings. Processing system 100 may be interconnected to such remote data processing systems by way of a physical and/or logical network 12, such as a local area network (LAN), a wide area network (WAN), an intranet, the Internet, etc. Communications involving network 12 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Within processing system 100, processors 110A and 110B may be communicatively coupled to one or more volatile or non-volatile data storage devices, such as memory 120. Memory 120 may include random access memory (RAM), read-only memory (ROM), mass storage devices such as integrated drive electronics (IDE) hard drives, and/or other devices or media, such as floppy disks, optical storage, tapes, flash memory, memory sticks, digital video disks, biological storage, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processors 110A and 110B may also be communicatively coupled to additional components, such as video controllers, small computer system interface (SCSI) controllers, network controllers, universal serial bus (USB) controllers, input devices such as a keyboard and mouse, etc. Processing system 100 may also include one or more bridges or hubs, such as a memory controller hub, an input/output (I/O) controller hub, a PCI root bridge, etc., for communicatively coupling various system components. As used herein, the term "bus" may be used to refer to shared communication pathways, as well as point-to-point pathways.

Some components, such as a NIC for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

System 100 includes processors 110A and 110B and memory 120. Memory 120 may be virtually separated by an operating system or other software into process address spaces. Processors 110A and 110B are connected to memory 120 via system bus 140 and interconnections 141*a*, 141*b*, and 141*m*. System bus 140 also provides access to network interface 150 via interconnection 141*n*.

Figure 2:
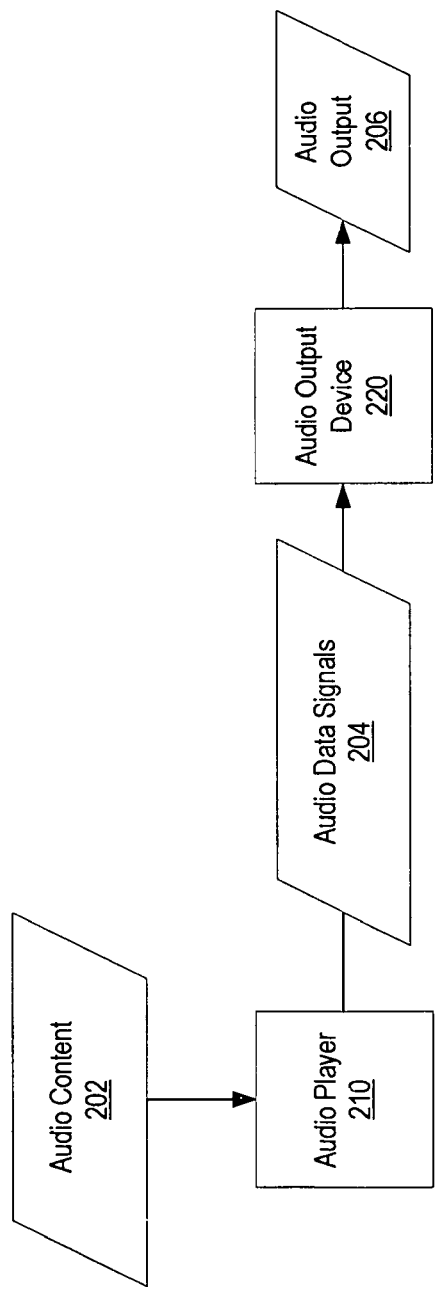
FIG. 2 is a diagram of a prior art audio player.

FIG. 2 is a diagram of a prior art audio player. Audio player 210 receives audio content 202, such as music files or other audio content files. Audio player 210 processes the audio content 202 to produce audio data signals 204 and sends audio data signals 204 to an audio output device 220, such as earphones and/or speakers. Audio output device 220 provides audio output 206, such as music.

Figure 3:
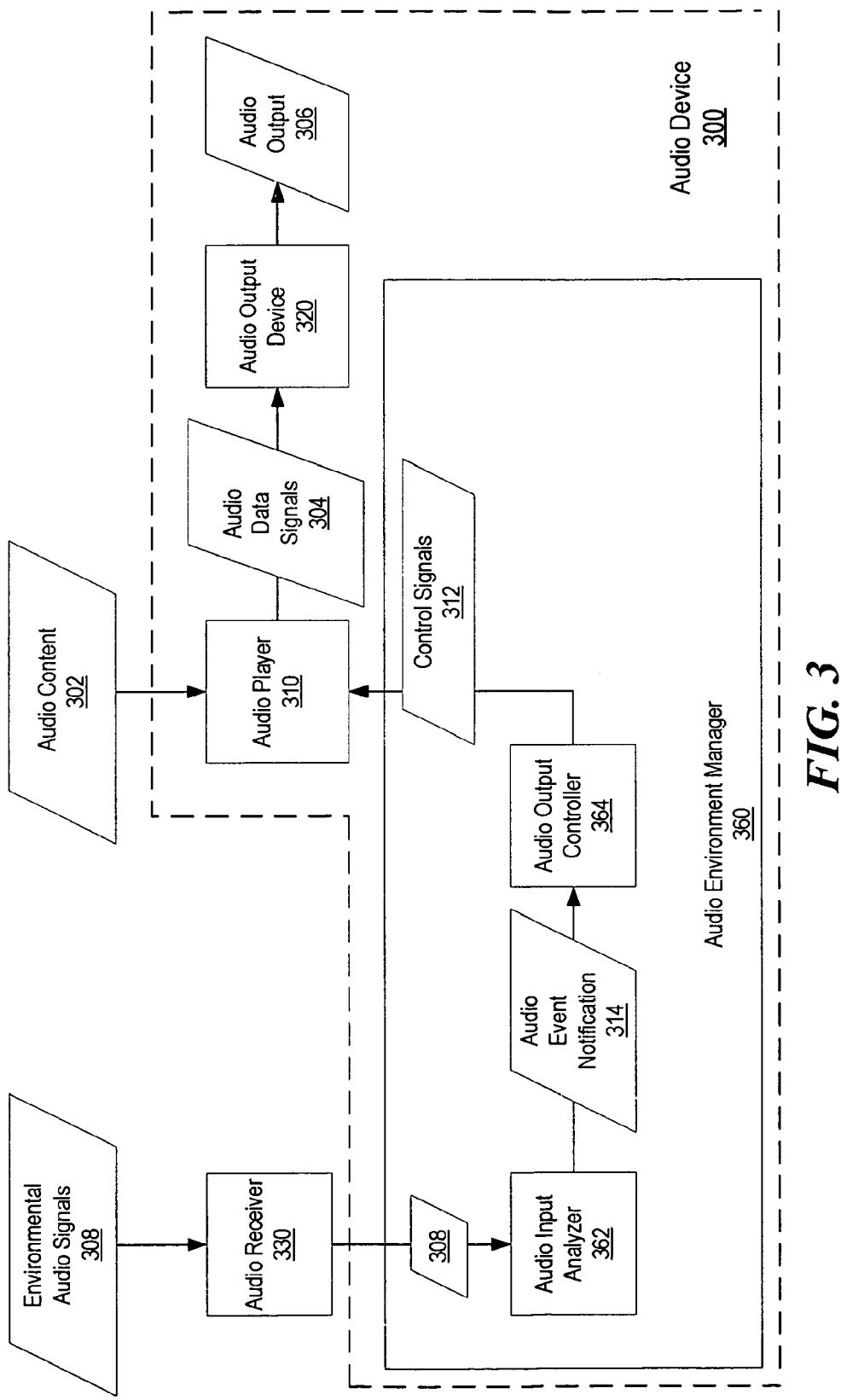
FIG. 3 is a diagram of an audio environment manager configured in accordance with one embodiment of the invention.

FIG. 3 is a diagram of an audio environment manager 360 configured in accordance with one embodiment of the invention. In this embodiment, audio environment manager 360 is shown as a part of an audio device 300, which also includes an audio player 310, although audio player 310 may be external to audio device 300 and communicatively coupled to audio device 300. Similarly, audio device 300 is shown as including audio output device 320, such as earphones and/or speakers, but audio output device 320 may be external to audio device 300.

Audio environment manager 360 is configured to identify audio events in the surrounding environment and to control audio player 310 in response to those environmental audio events. Audio environment manager 360 is an example of one embodiment of the audio environment manager 160 of FIG. 1 and may be implemented as instructions loaded into memory 120 of FIG. 1 and executed on processor 110A and/or 110B of FIG. 1.

Audio player 310 is similar to the prior art audio player 210 of FIG. 2, but is configured to operate with an audio output controller 364 component of environment audio manager 360. Audio output controller 364 sends control signals 312 to control the operation of audio player 310. Under the control of control signals 312, audio player 310 receives audio content 302 and provides audio data signals 304 to audio output device 320, which produces audio output 306.

Audio environment manager 360 is also configured to operate with an audio receiver 330 which receives environmental audio signals 308 from the environment in which audio player 310 is operating. As shown in FIG. 3, audio receiver 330 may be a microphone or other audio receiving device external to but communicatively coupled to audio device 300. Alternatively, audio receiver 330 may be part of audio device 300, such as a microphone built into audio device 300. Audio receiver 330 may communicate with audio environment manager 360 via a network, such as network 12 of FIG. 1, or via a direct physical connection such as system bus 140 of FIG. 1. Audio receiver 330 passes environmental audio signals 308 to an audio input analyzer 362 component of audio environment manager 360.

Audio input analyzer 362 analyzes environmental audio signals 308 to identify audio events of interest in the surrounding environment. Audio input analyzer 362 can be configured so that only selected, pre-determined types of sounds in the surrounding environment affect the control of audio player 310. Audio events identified by audio input analyzer 362 are one of a set of pre-determined audio event types. For example, if someone in the surrounding environment calls the name of the user of the device, audio input analyzer 362 can be configured to recognize the user's name as one of a set of pre-determined words. Audio input analyzer 362 may therefore include a speech recognition component to recognize pre-determined words, names, and/or phrases. Other types of audio event types include recognition of a voice using speech biometrics or recognition of a pre-determined sound such as a siren, doorbell or phone ringing using sound recognition techniques. The proximity of the sound in relation to the audio device may also be used to assess whether a sound is of interest; sound source location can be determined, for example, using advanced triangulation techniques.

In response to the identification of an audio event that is one of the pre-determined audio event types, audio input analyzer 362 can be configured to send an audio event notification 314 to audio output controller 364. Audio output controller 364 can be configured to send appropriate control signals 312 to audio player 310 in response to notification of a particular type of audio event. For example, audio output controller 364 may be configured to respond to the user's name recognition event by causing audio player 310 to adjust the audio output by pausing the sending of audio data signals 304 to audio output device 320, thereby allowing the user to hear the speaker. Alternatively, audio output controller may be configured to respond to the user's name recognition event by causing audio player 310 to adjust the audio output by lowering the volume of the audio output so that the speaker can be more easily heard.

This novel approach of audio environment manager 360 in identifying audio events in the surrounding environment and adjusting the audio output in response to those environmental audio events differs from the operation of most audio players in use today. For example, cell phones that have music players may pause the music when an incoming call arrives. However, this control is triggered not by identifying an audio event in the surrounding environment, but rather by a signal generated within the audio device itself. Similarly, a car stereo may decrease its volume when a Global Positioning System navigation device provides verbal directions to a driver of the vehicle. This coordination occurs via the input channels to the stereo system itself, and not as a result of identifying external audio events in the surrounding environment.

Figure 4:
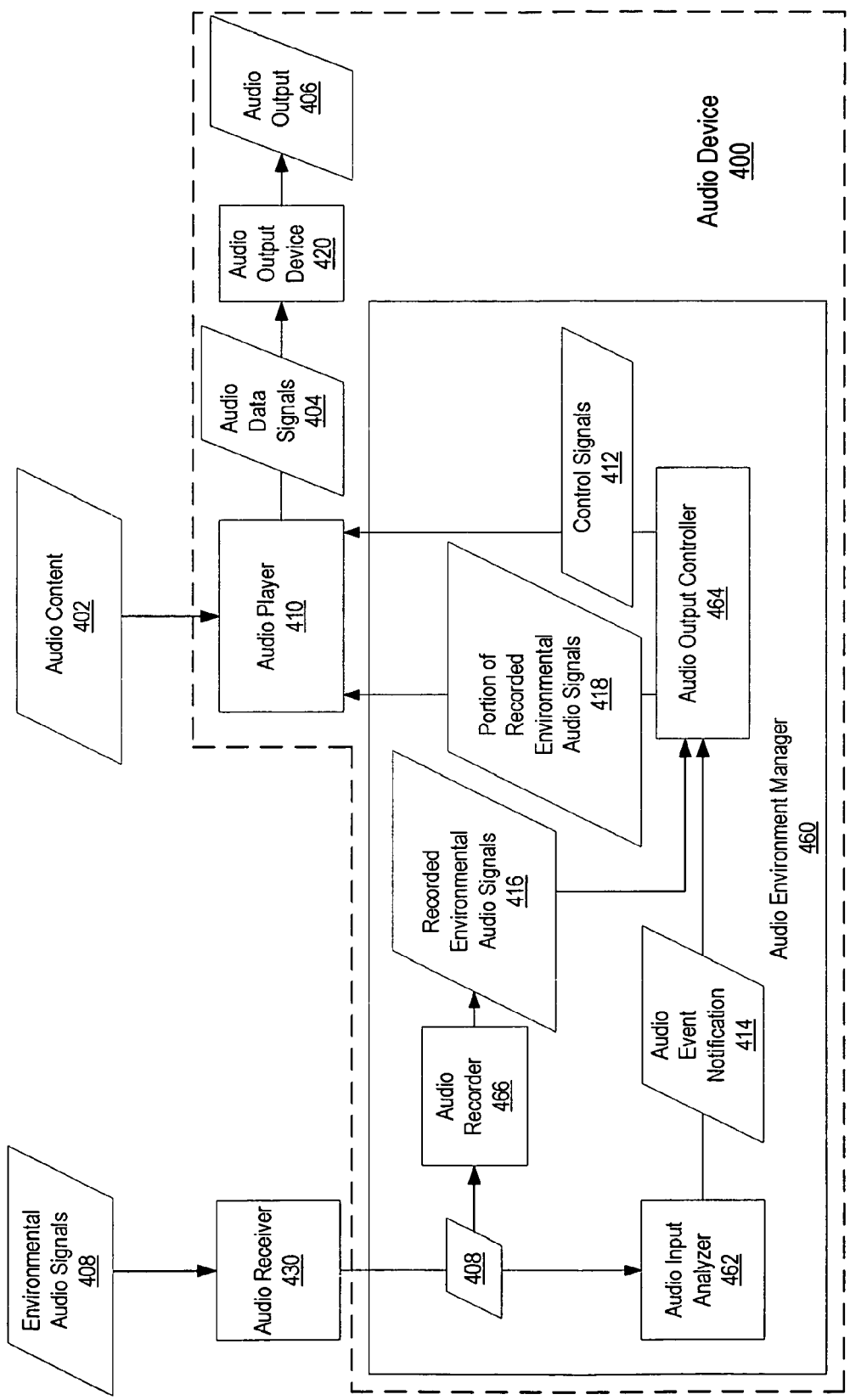
FIG. 4 is a diagram of an audio environment manager configured in accordance with another embodiment of the invention.

FIG. 4 is a diagram of an audio environment manager 460 configured in accordance with another embodiment of the invention. In this embodiment, audio environment manager 460 is configured to handle the situation where a significant amount of time is required to identify an audio event. For example, the speech recognition component of an audio input analyzer such as audio input analyzer 362 of FIG. 3 may recognize a word only after the word has been completely pronounced. If someone says "Hello, John, how are you?," audio input analyzer 362 can send an audio event notification 314 only after the word "John" has been completely pronounced and recognized as one of the predetermined words of interest. A control signal 312 cannot be sent in time for the user of the audio player to hear the entire message because the speaking voice may not yet be recognized as an audio event of interest. The audio player may only be able to pause the audio output in time for the user to hear the "how are you?" portion of the message.

In the embodiment shown in FIG. 4, environmental audio signals 408 are provided by audio receiver 430 not only to audio input analyzer 462, but also to an audio recorder 466 component of audio environment manager 460. While audio recorder 466 is shown within audio environment manager 460, audio recorder 466 may be a separate component external to audio environment manager 460 but in communication therewith. Audio recorder 466 records the audio input to audio receiver 430 and provides recorded environmental audio signals 416 to audio output controller 464. In response to receiving audio event notification 414, audio output controller 464 can send a portion of the recorded environmental audio signals 418 to audio player 410 in addition to control signals 412.

Upon identifying an audio event, audio output controller 464 can control the audio player 410 to replay a recorded portion of the audio input. For example, audio output controller 464 may configure the portion of recorded environmental audio signals 418 to include a portion of the audio input that was recorded prior to the identification of the audio event. This portion of the environmental audio signals 418 that was recorded prior to identification of an audio event is unlikely to have been heard by the user, as the sounds occurred before control of the audio player could be affected and therefore are likely to have been obscured by the audio output of the audio player 410. This portion of the environmental audio signals 418 that was recorded prior to identification of an audio event is referred to herein as a preceding portion or a portion preceding the audio event. In the example message provided above, "Hello, John, how are you?," the preceding portion of the audio input "Hello, John" can be included in the portion of recorded environmental audio signals 418 to be replayed. Audio player 410 can then be configured to play the entire message, "Hello, John, how are you?" rather than only the "how are you?" portion recorded after the identification of the audio event.

Audio output controller 464 may cause the audio player 410 to pause playing a first audio output, such as music, during the replay of the recorded portion of the audio input. Alternatively, audio output controller 464 may cause the audio player to lower the volume of a first audio output, such as music, while replaying the recorded portion of the audio input. Such an implementation would enable the recorded portion of the audio input to be simultaneously played along with the original audio input.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for controlling output of an audio player using environmental audio analysis. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. An apparatus comprising:
at least one processor, which is coupled to at least one memory, a microphone, and an audio player, to perform operations comprising:
analyzing audio input received by the microphone from an external environment of the microphone to determine the audio input corresponds to a unique biometric;
recording the audio input; and
replaying a recorded portion of the audio input in response to determining that the audio input corresponds to the unique biometric, wherein the recorded portion comprises a preceding portion that was recorded prior to determining the audio input corresponds to the unique biometric; and
lowering a volume of a first audio output of the audio player while simultaneously replaying the recorded portion of the audio input.

2. The apparatus of claim 1, wherein the unique biometric corresponds to a voice of a user.

3. The apparatus of claim 2, wherein the operations comprise associating the voice with the user.

4. The apparatus of claim 1, wherein lowering the volume does not include silencing the volume.

5. The apparatus of claim 1, wherein lowering the volume includes causing the audio player to lower the volume.

6. The apparatus of claim 5, wherein causing the audio player to lower the volume includes providing a control signal to the audio player.

7. The apparatus of claim 5 including an audio controller, wherein causing the audio player to lower the volume includes the audio controller providing a control signal to the audio player.

8. The apparatus of claim 1, wherein the unique biometric is stored in the at least one memory.

9. The apparatus of claim 1, wherein the audio output is delivered via at least one speaker coupled to the processor.

10. The apparatus of claim 1, wherein the operations comprise analyzing the audio input to determine the audio input corresponds to a predetermined audio event.

11. The apparatus of claim 10, wherein the predetermined audio event includes a predetermined word.

12. The apparatus of claim 11, wherein the predetermined word includes a person's name.

13. The apparatus of claim 10, wherein the operations comprise lowering the volume in response to determining the audio input corresponds to the predetermined audio event.

14. The apparatus of claim 10, wherein the predetermined audio event includes a predetermined sound that is not a word.

15. The apparatus of claim 1, wherein the operations comprise analyzing the audio input to determine the audio input corresponds to a predetermined audio event included in a set of predetermined words.

16. The apparatus of claim 1, wherein lowering the volume of the audio output comprises lowering the volume such that the audio output of the audio player remains audible.

17. At least one non-transitory computer-readable medium comprising instructions, wherein the instructions, when executed in a processing system comprising a processor coupled to at least one memory, a microphone and an audio player, cause the processing system to:
analyze audio input received by the microphone from an external environment of the microphone to determine the audio input corresponds to a unique biometric;
record the audio input; and
replay, by the audio player, a recorded portion of the audio input in response to determining that the audio input corresponds to the unique biometric, wherein the recorded portion comprises a preceding portion that was recorded prior to determining the audio input corresponds to the unique biometric; and
lower a volume of a first audio output of the audio player while simultaneously replaying the recorded portion of the audio input.

18. The non-transitory computer-readable medium of claim 17, wherein lowering the volume of the audio output comprises lowering the volume such that the audio output of the audio player remains audible.

19. The non-transitory computer-readable medium of claim 18, wherein the unique biometric corresponds to a voice of a user.

* * * * *